US009712574B2

(12) United States Patent
Bosworth et al.

(10) Patent No.: US 9,712,574 B2
(45) Date of Patent: Jul. 18, 2017

(54) REAL-WORLD VIEW OF LOCATION-ASSOCIATED SOCIAL DATA

(75) Inventors: Andrew Garrod Bosworth, San Mateo, CA (US); Michael John McKenzie Toksvig, Palo Alto, CA (US); David Harry Garcia, Sunnyvale, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 13/600,887

(22) Filed: Aug. 31, 2012

(65) Prior Publication Data

US 2014/0067937 A1 Mar. 6, 2014

(51) Int. Cl.

*G06Q 50/00* (2012.01)
*H04L 29/08* (2006.01)
*H04L 29/06* (2006.01)
*G06Q 30/02* (2012.01)

(52) U.S. Cl.

CPC ........... *H04L 65/403* (2013.01); *G06Q 30/02* (2013.01); *G06Q 50/01* (2013.01); *H04L 67/18* (2013.01); *H04L 67/306* (2013.01)

(58) Field of Classification Search

CPC ... H04L 65/00–65/4061; H04L 67/00–67/306; G06Q 30/00–30/0271; G06Q 50/01

See application file for complete search history.

(56) References Cited

U.S. PATENT DOCUMENTS 8,180,396 B2 * 5/2012 Athsani et al. ............... 455/557
2009/0061884 A1 * 3/2009 Rajan et al. .................. 455/445
2009/0102859 A1 4/2009 Athsani
2009/0248852 A1 * 10/2009 Fuhrmann et al. ........... 709/224
2010/0076968 A1 3/2010 Boyns
2010/0228577 A1 * 9/2010 Cunningham et al. ........... 705/5
2011/0313657 A1 12/2011 Myllymaki
2011/0319148 A1 * 12/2011 Kinnebrew et al. .............. 463/1
2012/0038670 A1 * 2/2012 Choi ....................... G06T 7/004 345/633
2012/0047565 A1 2/2012 Petersen (Continued)

OTHER PUBLICATIONS

Search Report and Written Opinion of PCT Application No. PCT/2013/056938, Nov. 27, 2013.

*Primary Examiner* — Nicholas Taylor
*Assistant Examiner* — Clayton R Williams
(74) *Attorney, Agent, or Firm* — Baker Botts L.L.P.

(57) ABSTRACT

Particular embodiments maintain social-networking information associated with a user, wherein the user is represented by a user node in a social graph. One or more nodes of the social graph may be associated with respective locations. A request for social information related to a location may be received from a computing device. The request may comprise a location of the computing device, an orientation of the computing device, and an identifier for the user. A relevance score may be determined for one or more proximate nodes based on the request, the social-networking information associated with the user, and the location information for the respective proximate node. Each proximate node may be associated with at least one location within a threshold distance from the location of the computing device. Particular embodiments may provide social-networking information associated with at least one of the proximate nodes for display in conjunction with an image.

19 Claims, 6 Drawing Sheets

200

210 Maintaining social-networking information for a user

220 Associating one or more nodes in a social graph with respective locations

230 Receiving a request for social information related to a location, the request comprising a location, an orientation, and user identity info 240 Determining a relevance score for each proximate node based on the request, the user's social-networking information, and the proximate node's location 250 Ranking the proximate nodes by their respective relevance scores 260 Providing information associated with at least one proximate node for display on a computing device in conjunction with an image 270 Receiving indication of an action by the user associated with a proximate node 280 Updating the social graph in response to the received indication

(56) References Cited

U.S. PATENT DOCUMENTS

| | | | | |
|---|---|---|---|---|
| 2012/0095863 | A1* | 4/2012 | Schiff et al. | 705/26.7 |
| 2012/0098859 | A1* | 4/2012 | Lee | G06K 9/6807 345/633 |
| 2012/0166433 | A1 | 6/2012 | Tseng | |
| 2012/0197724 | A1 | 8/2012 | Kendall | |
| 2012/0209826 | A1* | 8/2012 | Belimpasakis | G06F 17/3087 707/710 |
| 2012/0310968 | A1* | 12/2012 | Tseng | 707/769 |
| 2013/0046823 | A1* | 2/2013 | Mitchell et al. | 709/204 |
| 2013/0124499 | A1* | 5/2013 | Liau | G06F 15/16 707/709 |
| 2013/0132434 | A1* | 5/2013 | Scofield et al. | 707/771 |
| 2014/0015826 | A1* | 1/2014 | Licata | 345/419 |

* cited by examiner

REAL-WORLD VIEW OF LOCATION-ASSOCIATED SOCIAL DATA

TECHNICAL FIELD

This disclosure generally relates to social-networking information, in particular, social-networking information associated with a location.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users. The social-networking system may transmit over one or more networks content or messages related to its services to a mobile or other computing device of a user. A user may also install software applications on a mobile or other computing device of the user for accessing a user profile of the user and other data within the social-networking system.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, an image of a physical space is displayed together with social-networking information. Locations in the physical space may be associated with nodes in a social graph associated with a social-networking system. Social-networking information associated with such location-associated nodes can be displayed together with the image. Users can also take actions on locations in the physical space that have been associated with a node in the social graph, e.g, "Like." Selection of proximate nodes and associated content may be based on scoring relevancy to a user content and may be presented in ranked order.

DESCRIPTION OF PARTICULAR EMBODIMENTS

Example Embodiments

Figure 1:
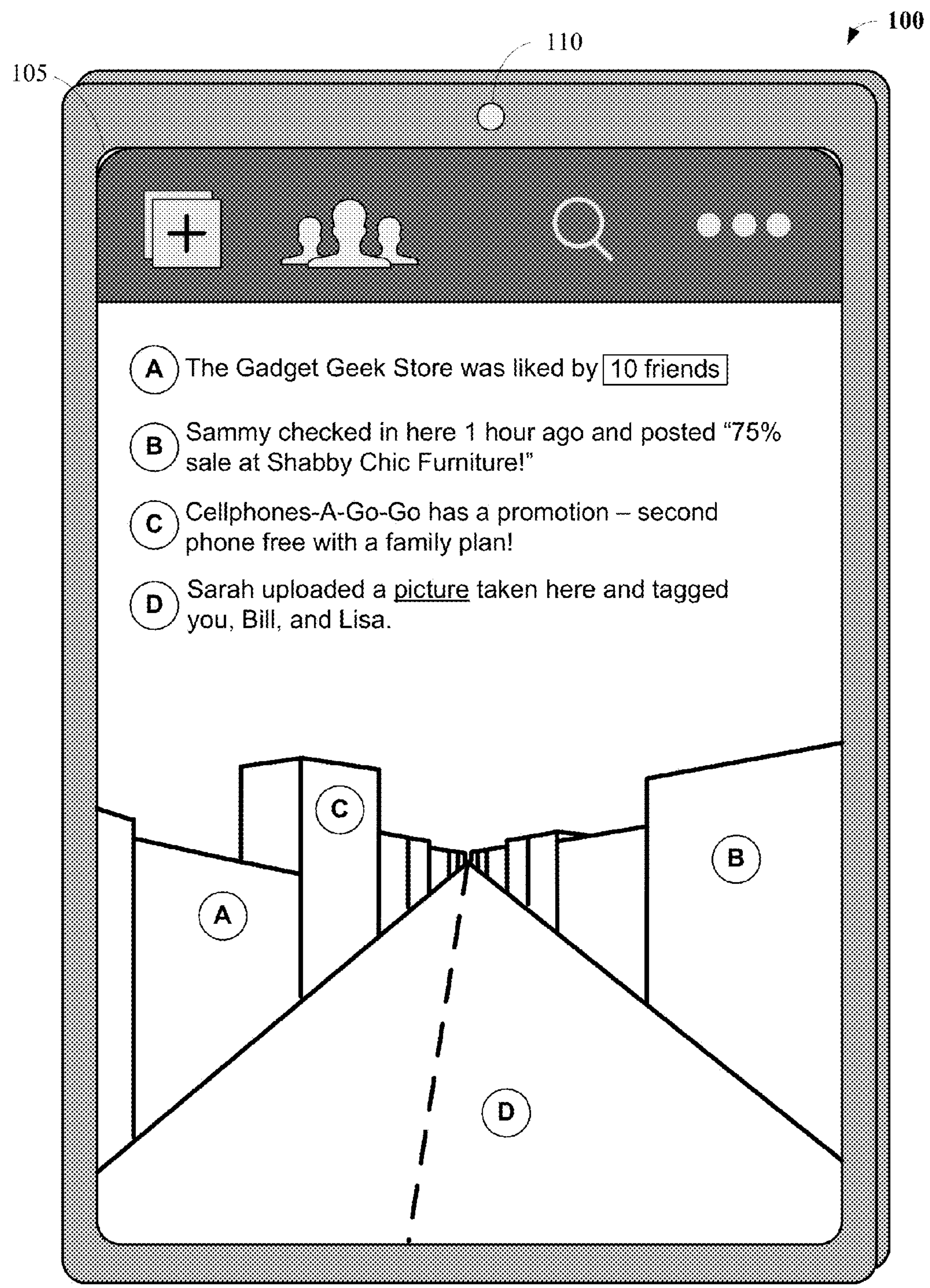
FIG. 1 is an example wireframe showing examples of social-networking information overlaying an image of the user's real-world physical environment.

FIG. 1 is an example wireframe showing examples of social-networking information overlaying a live video image of the user's real-world physical environment, as captured by a user's smartphone. The social-networking information is associated with nodes in the social graph that are assigned to proximate locations. In particular embodiments, smartphone 100 includes a display screen 105 and a camera 110. Camera 110 may be capable of capturing video, static images, or both. Smartphone 100 may be able to connect to a social-networking system by way of a communications network, such as a cell network or Wi-Fi. Particular embodiments of a network environment associated with a social-networking system are described in further detail in FIG. 5 and related text in the specification. Smartphone 100 may be able to detect its own location via GPS. Smartphone 100 may also include a compass that detects what direction smartphone 100 is pointed in, with respect to camera 110. Smartphone 100 may also include a gyrometer that detects the orientation of smartphone 100 (e.g., whether smartphone 100 is tilted up or down, or turned horizontal). As one of skill in the art would be aware, embodiments of the invention are not limited to receiving requests from or sending information to a smartphone and may be performed in association with other types of computing devices as described in FIG. 6 and related text in the specification.

The user associated with smartphone 100 may be a member of a social-networking system, in which the device user's profile, connection information, and content associations are maintained. The user may be represented by a user node in the social graph. Friends of the user may also be represented by user nodes in the social graph and connected to the user by edges in the social graph representing one or more degrees of separation. Content with which the user is associated may be represented by concept nodes in the social graph. Particular embodiments of the social graph are described in further detail in FIG. 4 and related text in the specification.

In the example wireframe in FIG. 1, a user holding smartphone 100 captures live video of a downtown street using camera 110, including stores on either side of the street. At least four of these stores are represented by concept nodes in the social graph, and each of those concept nodes have been associated with a location.

As smartphone 100 captures the live video, a request from smartphone 100 is received at the social-networking system—the request is for social-networking information related to that location, with respect to the direction in which the camera is pointing. Computer servers associated with the social-networking system determine that four of the proximate nodes are relevant to the user and rank the proximate nodes. In the example shown in FIG. 1:

Location A is a store represented in the social graph by a concept node with an associated website. Ten of the user's friends indicated that they liked The Gadget Geek Store. Due to location A's proximity to the user, the high number of close connections who indicated an affinity for this location, and the user's own indicated interest in gadgets, location A was deemed relevant and ranked highest.

Location B is a store represented in the social graph by a concept node with an associated website. One of the user's friends recently checked-in at this location (1 hour ago) and posted a comment: "75% sale at Shabby Chic Furniture!" Due to location B's proximity to the user and the recency of the posting by a friend of the user, location B was deemed relevant and ranked second highest.

Location C is a store represented in the social graph by a concept node. This store (Cellphones-A-Go-Go) is currently running a promotion for which they set up a focused advertising program ("second phone free with a family plan!"). Due to location C's proximity to the user and the fact that the user recently changed their status to "Married," location C was deemed relevant and ranked third highest.

Location D is a geographical location at which a friend of the user took a photo in association with the location and then tagged the user and two other people by selecting their faces in the photo. Due to location D's proximity to the user and the fact that the user was associated with content that was associated with this location, location D was deemed relevant and ranked fourth highest.

Figure 2:
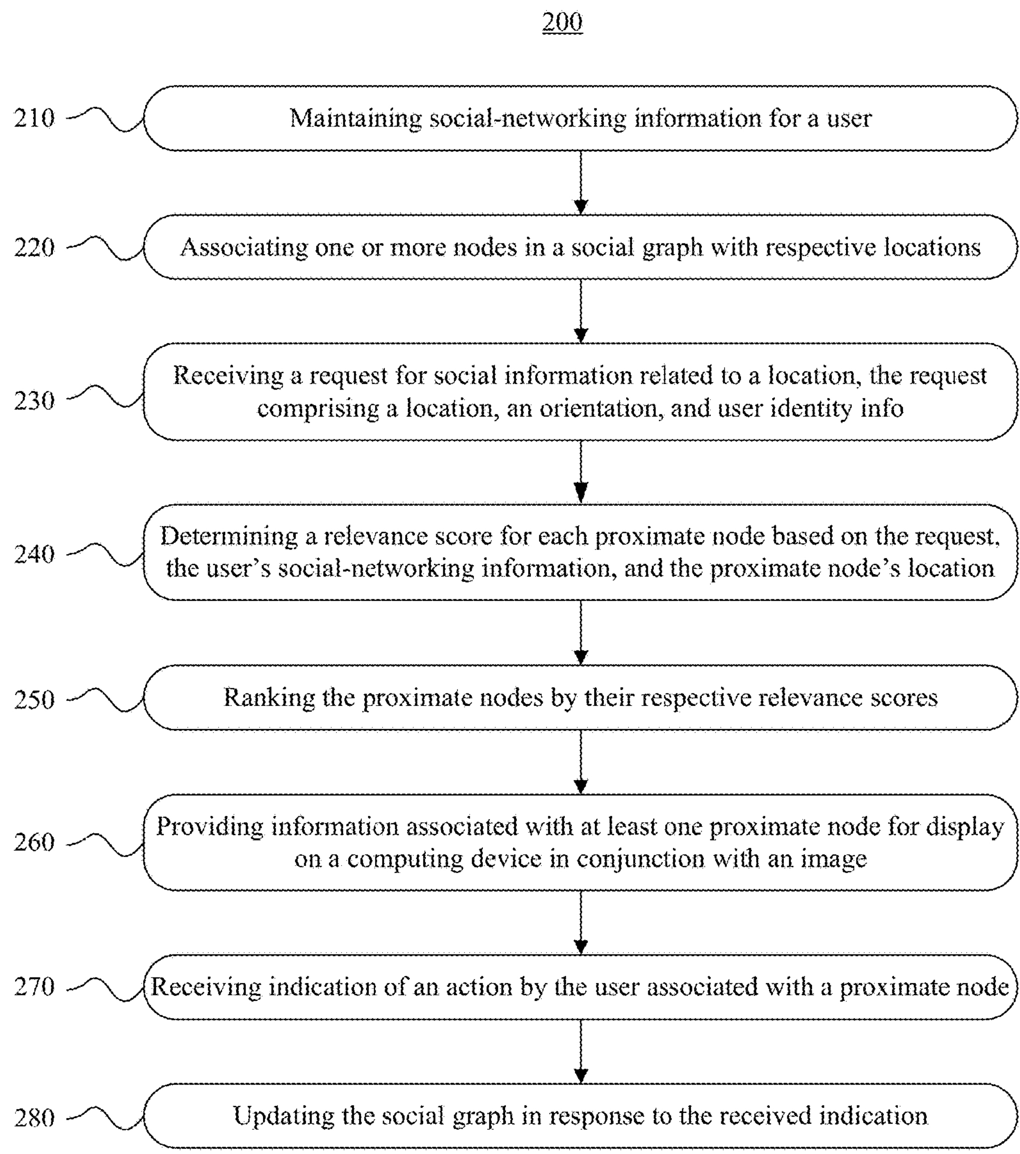
FIG. 2 is a flowchart of an example method according to particular embodiments.

The steps involved in producing the overlay of social-networking information over an image, as shown in FIG. 1, are described in further detail in FIG. 2 and related text in the specification.

FIG. 2 is a flowchart of an example method for displaying social-networking information in conjunction with an image of a real-world environment. In step 210, particular embodiments maintain social-networking information for a user represented by a user node in a social graph. This includes user profile information, interests, connection/relationship information, a history of actions taken with respect to other nodes in the social graph, content associated with the user, etc. Social-networking information may also include affinity information for the user according to one or more categories. Particular embodiments of social-networking information are described in further detail in FIG. 4 and related text in the specification.

In step 220, particular embodiments associate one or more nodes of the social graph with respective locations. This association may occur in a number of different ways. A user may manually associate a location with a node in the social graph. For example, a manager of a restaurant may update a profile for the restaurant with its location, or a user may select a node and check in to the node while in a particular location detected via GPS. A user may upload content, tag it with a location, and then associate the content with one or more nodes in the social graph. For example, a user may upload a video of a children's birthday party, tag it as having occurred at a local park, and then tag a clown or balloon artist or bouncy house in the video and link the video to a web site for party entertainment services. A data mining algorithm may detect address information in content associated with a node (e.g., detecting an address in a website associated with a node). A third-party server may provide content objects in association with a node of the social graph. Such content objects may include informational content objects, e.g., movie show times, movie reviews, sale information, restaurant menus, and the like, as well as incentive content objects, e.g., coupons, discount tickets, gift certificates, etc.

In step 230, particular embodiments receive a request for social information related to a location from a computing device. The request may comprise a location of the computing device, an orientation of the computing device, and information identifying the user. In particular embodiments, the request may also include an image of the location, or information to access a video feed of the location.

In particular embodiments, the computing device has a camera for taking video or static images. In particular embodiments, the computing device transmits video or static images in real time. In particular embodiments, the computing device either has stored or has access to video or static images. In particular embodiments, the location of the computing device is the same as a location of the user (i.e., the user is holding the computing device). For example, the computing device may be a smartphone equipped with a camera lens that the user is holding up to capture live video. In particular embodiments, the computing device is not associated with a particular user (e.g., a webcam overlooking a busy city street, or a video camera mounted on a moving vehicle). The location information may be obtained directly from the computing device, e.g., at the time of the request, at the time a notification is to be sent or at various time intervals, or the social networking system may retrieve a last stored location for the computing device. In addition, when a computing device changes locations, the updated location information may be provided to the social networking system. In particular embodiments, the orientation of the computing device comprises information that the computing device is pointing in a particular direction (e.g., north, along a street running north-south).

In step 240, particular embodiments determine a relevance score for one or more proximate nodes based on (1) the request, (2) the social-networking information associated with the user, and (3) the location information for the respective proximate node. In particular embodiments, whether a node is "proximate" may be based on whether the node is associated with a location within a threshold distance from the location of the computing device. In particular embodiments, a node may be associated with more than one location, of which at least one must be within the threshold distance from the location of the computing device. For example, depending upon the view captured in the image, In particular embodiments, determination of the relevance score for a proximate node may comprise combining a location value, an interest value, a connection value, and a time value.

The location value may be based on a proximity between the location associated with the proximate node and the location in the request and/or the orientation in the request.

The interest value may be based on whether a category associated with the proximate node is included in the one or more categories associated with the affinity information for the user. For example, if the proximate node is The Gadget Geek Store, it may be associated with categories of "retail store" and "computing devices," and the user may have interests including "shopping" and "gadgets."

The connection value may be based on a number of the user's connections with the proximate node. For example, a connection of the user has checked-in to, liked, or commented on an establishment.

The time value may be based on whether a current time is within a delivery time range for content (e.g., a notification or promotion) associated with the proximate node In particular embodiments, the delivery time range indicates whether the content is eligible to be sent to the user. For example, a discount coupon for lunch at a restaurant may be associated with lunch hours and is accordingly of higher interest during the hours commonly associated with lunch. In another example, a notification regarding the movie schedule at a nearby movie theater may change to display movies that start within a moving window of one hour from the current time.

In particular embodiments, the social-networking information for the user may include a user exposure to a particular node of the social graph. When determining the relevance score for a proximate node, the relevance score may be further adjusted based on the user's exposure to the node. For example, the relevance score may be increased if the user regularly visits a website associated with the node, or if many of the user's friends have checked in at a location associated with the node, or if the user is a follower of newsfeeds related to the node.

In step 250, particular embodiments rank the proximate nodes by their respective relevance scores, e.g., from highest relevance score to lowest, or by selection of a limited number of the highest-scoring nodes. In particular embodiments, the social-networking system may log user exposures to nodes and associations between users and objects, for example, if the user was given a recommendation to visit a store and the computing device detects that the user visited the store shortly thereafter. The exposure information can be used to determine whether to expose the user to the same or similar nodes, and for adjusting the ranking and selection of proximate nodes on the basis of whether the user previously has been exposed to the same or similar nodes. In addition, if a user becomes associated with a node via an action, e.g., uses an incentive, goes to the location, etc., that information also is stored, and can be used for re-ranking and re-selecting the nodes.

In step 260, particular embodiments provide information associated with at least one of the one or more proximate nodes to the computing device for display together with an image. The image may be video or a static image. In particular embodiments, the image may include metadata comprising the location of the computing device and the orientation of the computing device. In particular embodiments, the image may be modified to include or accompanied by additional metadata comprising the information associated with at least one of the one or more proximate nodes.

In particular embodiments, the image may not have been captured by the computing device to which the information is being sent. For example, if a user is planning on visiting New York City, and is viewing a photo of the area immediately around their hotel as posted on the hotel's website, the user may request social-networking information for relevant proximate nodes, based on the photo. In another example, the request for social-networking information may have been provided with information associated with a live video feed from a webcam directed towards a busy city street so that, for example, a user planning a vacation to Las Vegas can see which establishments their friends liked and commented on, as well as which establishments are running promotions or providing discounts.

In step 270, particular embodiments receive an indication of an action by the user in association with a proximate node, i.e., a user exposure event. In one example, the user may indicate that they are boycotting a store represented by a proximate node. In another example, the user may purchase tickets for an event at a venue represented by a proximate node.

In step 280, particular embodiments update the social graph in response to the indication of an action by the user in association with a proximate node. Updating the social graph may comprise storing an association between the user and the proximate node including information associated with the user exposure event.

Figure 3:
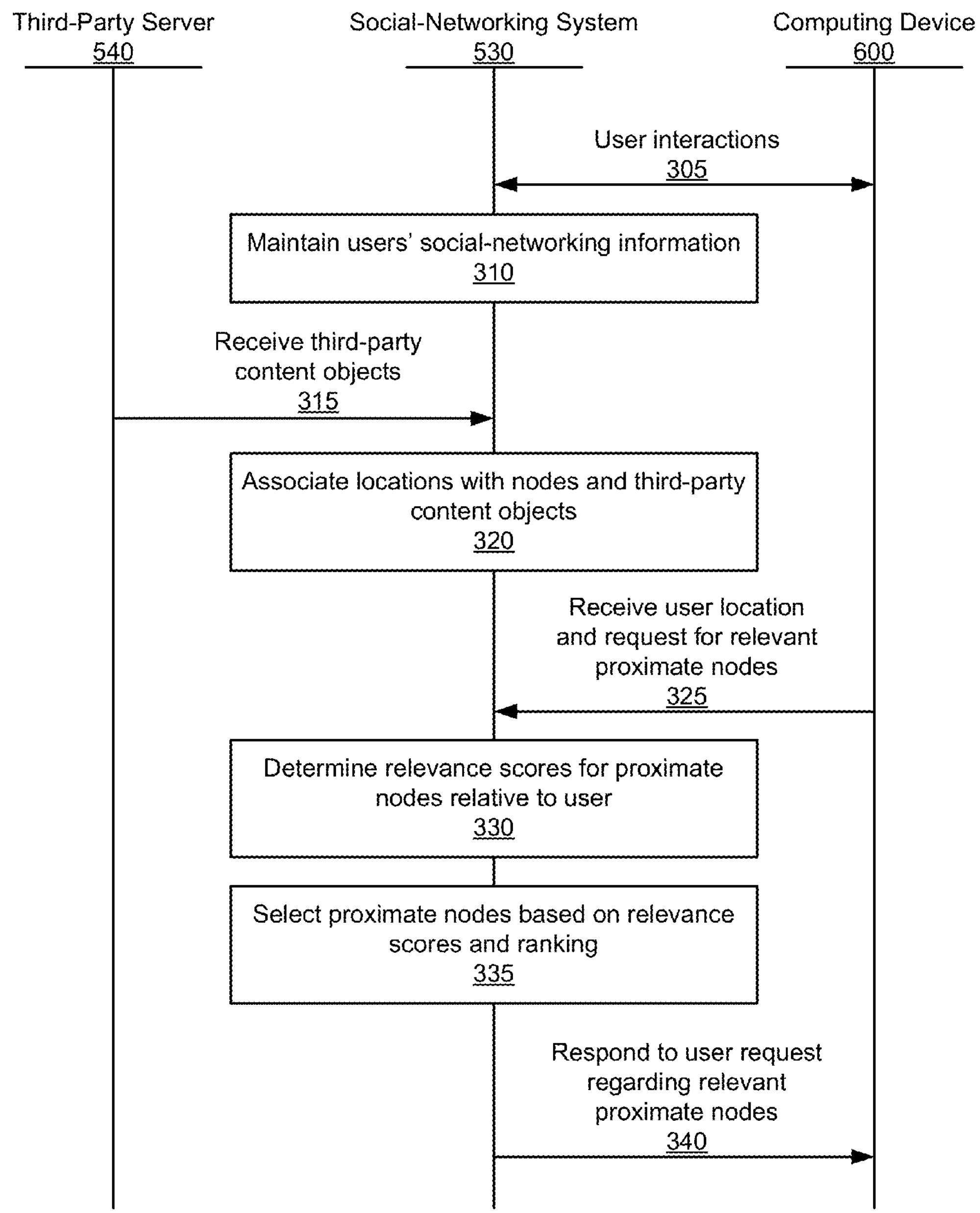
FIG. 3 is an interaction diagram of a process according to particular embodiments.

FIG. 3 is an interaction diagram of a process for responding to a request for information relevant to a user of a social networking system based on user location and social information. Initially, users may use computing devices 600 to interact 305 with each other via the social networking system 530 and with the social networking system 530 directly, providing it information about the user such as user interest and connection information. The social networking system 530 maintains 310 the social-networking information (e.g., interest and connection information for each user). In particular embodiments, the social networking system 530 may categorize the interest information into categories.

The social networking system 530 also receives 315 third-party content objects from one or more third-party servers 540. The third-party content objects may include informational content objects, such as movie show times, movie reviews, sale information, restaurant menus, etc., as well as incentive content objects, such as coupons, discount tickets, gift certificates, etc. In addition, some third-party content objects may include a combination of information and incentives.

Nodes and third-party content objects, (including both user-generated and third-party content objects) are associated with 320 locations, and may also be associated with categories and delivery time ranges. For example, regarding locations, a coupon for $2.00 off of a movie ticket at a particular movie theater chain may apply to all theaters in the chain, or just one theatre. A location may be general, e.g., a city, or specific, e.g., a particular street name, or intersection, or GPS coordinate. One or more such locations are assigned to each content object. Finally, a delivery time range is assigned to a content object. The range may reflect appropriate hours for the item. For example, if the content object is a coupon for a donut store that is open only in the morning, the range for the notification likely would correspond to the hours during which the donut store is open, or some other useful range related to the open hours, e.g., fifteen minutes before opening to thirty minutes before closing.

In particular embodiments, categories may be established by the social networking system 530 that reflect various categories of interests of users of the social networking system 530. The categories may be associated with the interests themselves, e.g., if a user "likes" an article about a brand of shoes, the category may be the brand. Alternatively, the social networking system 530 may assign the article about the shoe brand a general category of "shoes" or "clothing." The social networking system 530 may assign both of these categories to a single content object; thus, multiple categories may apply to a single content object. For example, for an incentive offering 20% off a specialty coffee drink at a particular coffee shop, the promotion may be assigned a category "food," type "beverage," and subtype "coffee." These tags can be matched to categories associated with user interests.

The social networking system 530 receives 325 a request from a requesting user for information regarding relevant proximate nodes. The user request may include information about the location of the computing device 600. This information may be obtained directly from the computing device 600, e.g., at the time of the request, at the time a notification is to be sent or at various time intervals, or the social networking system 530 may retrieve a last stored location for the computing device 600. In addition, when a computing device 600 changes locations, the updated location information may be provided to the social networking system 530. Alternatively, the user may provide a location specifying a constraint on the kinds of proximate nodes and/or third-party content objects in which they are interested.

The social networking system 530 determines 330, for each proximate node, a relevance score relative to the requesting user. The social networking system 530 uses the location, interest, time, and connection information for the user and the content objects to calculate the score. For example, the social networking system 530 may first calculate scores for each of these categories that are combined to get the relevance score.

From the relevance scores of the content objects, the social networking system 530 selects 335 the proximate nodes for a user, e.g., from a ranking of highest relevance score to lowest, or by selection of the highest relevance scored items.

The social networking system 530 then responds 340 to the user's request for relevant proximate nodes by providing, to the computing device 600, information in conjunction with a captured image. In particular embodiments, the social networking system provides the highest-ranked proximate nodes to the requesting user. In particular embodiments, the social networking system provides the proximate node with the highest relevance score to the requesting user.

Social Graphs

Figure 4:
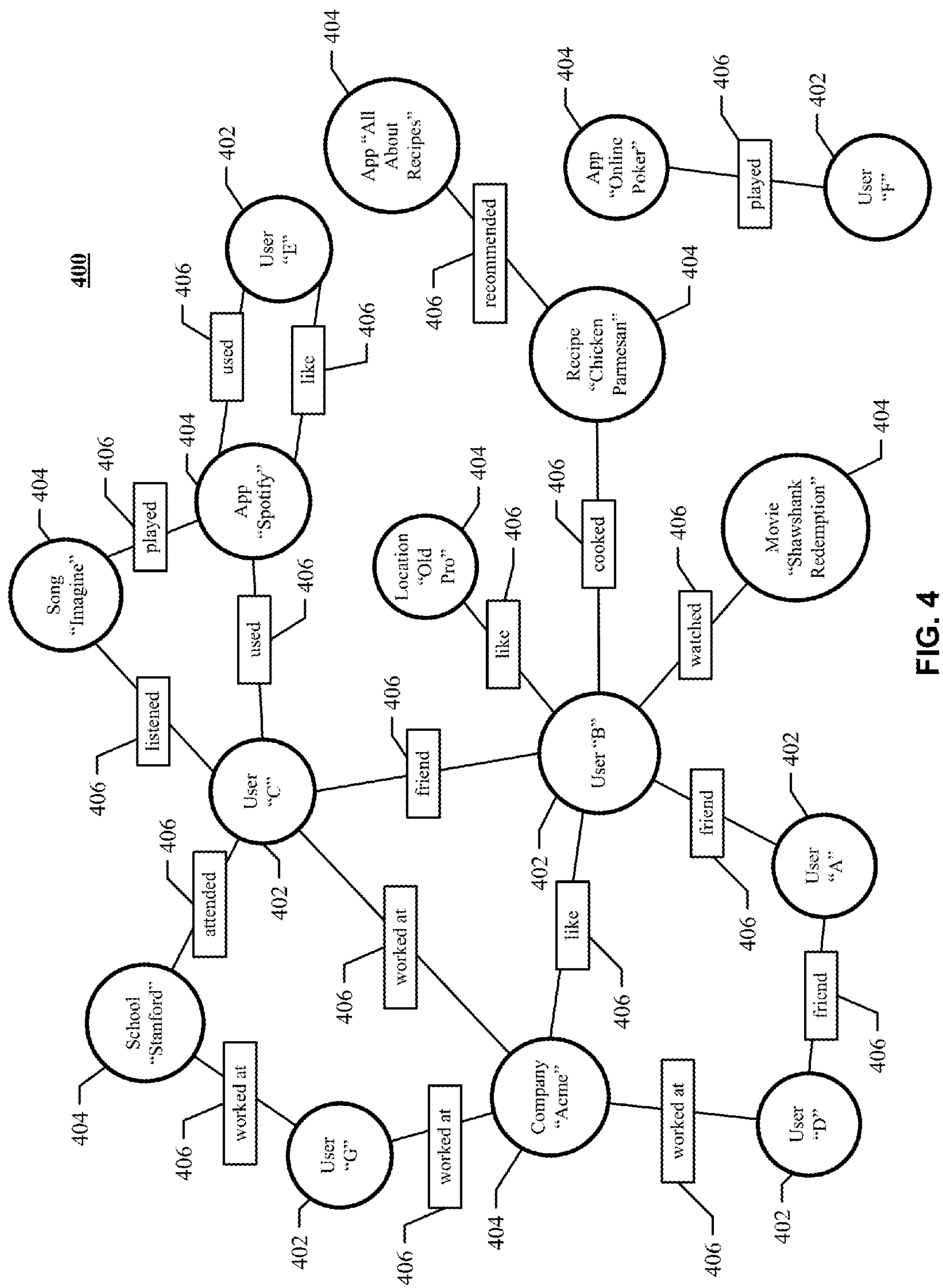
FIG. 4 is a block diagram of an example social graph.

FIG. 4 illustrates example social graph 400. In particular embodiments, social-networking system 530 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 530, client system 600, or third-party system 540 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 530. As an example and not by way of limitation, a user may be an individual (human user), an entity (e.g., an enterprise, business, or third-party application), or a group (e.g., of individuals or entities) that interacts or communicates with or over social-networking system 530. In particular embodiments, when a user registers for an account with social-networking system 530, social-networking system 530 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 530. In particular embodiments, a user node 402 may be associated with information provided by a user or information gathered by various systems, including social-networking system 530. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages or one or more user-profile pages (which may be webpages).

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 530 or a third-party website associated with a web-application server); an entity (such as, for example, a person, business, group, sports team, or celebrity); a resource (such as, for example, an audio file, video file, digital photo, text file, structured document, or application) which may be located within social-networking system 530 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including social-networking system 530. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to a webpage.

In particular embodiments, a node in social graph 400 may represent or be represented by a webpage (which may be referred to as a "profile page"). Profile pages may be hosted by or accessible to social-networking system 530. Profile pages may also be hosted on third-party websites associated with a third-party server 540. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 540. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 600 to transmit to social-networking system 530 a message indicating the user's action. In response to the message, social-networking system 530 may create an edge (e.g., an "eat" edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 530 may transmit a "friend request" to the second user. If the second user confirms the "friend request," social-networking system 530 may create an edge 406 connecting the first user's user node 402 to the second user's user node 402 in social graph 400 and store edge 406 as social-graph information in one or more of data stores 24. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to a edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 530 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 530 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 530 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 530 may create an edge 406 between a user node 402 and a concept node 404 in social graph 400. As an example and not by way of limitation, a user viewing a concept-profile page (such as, for example, by using a web browser or a special-purpose application hosted by the user's client system 600) may indicate that he or she likes the concept represented by the concept node 404 by clicking or selecting a "Like" icon, which may cause the user's client system 600 to transmit to social-networking system 530 a message indicating the user's liking of the concept associated with the concept-profile page. In response to the message, social-networking system 530 may create an edge 406 between user node 402 associated with the user and concept node 404, as illustrated by "like" edge 406 between the user and concept node 404. In particular embodiments, social-networking system 530 may store an edge 406 in one or more data stores. In particular embodiments, an edge 406 may be automatically formed by social-networking system 530 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

System Overview

Figure 5:
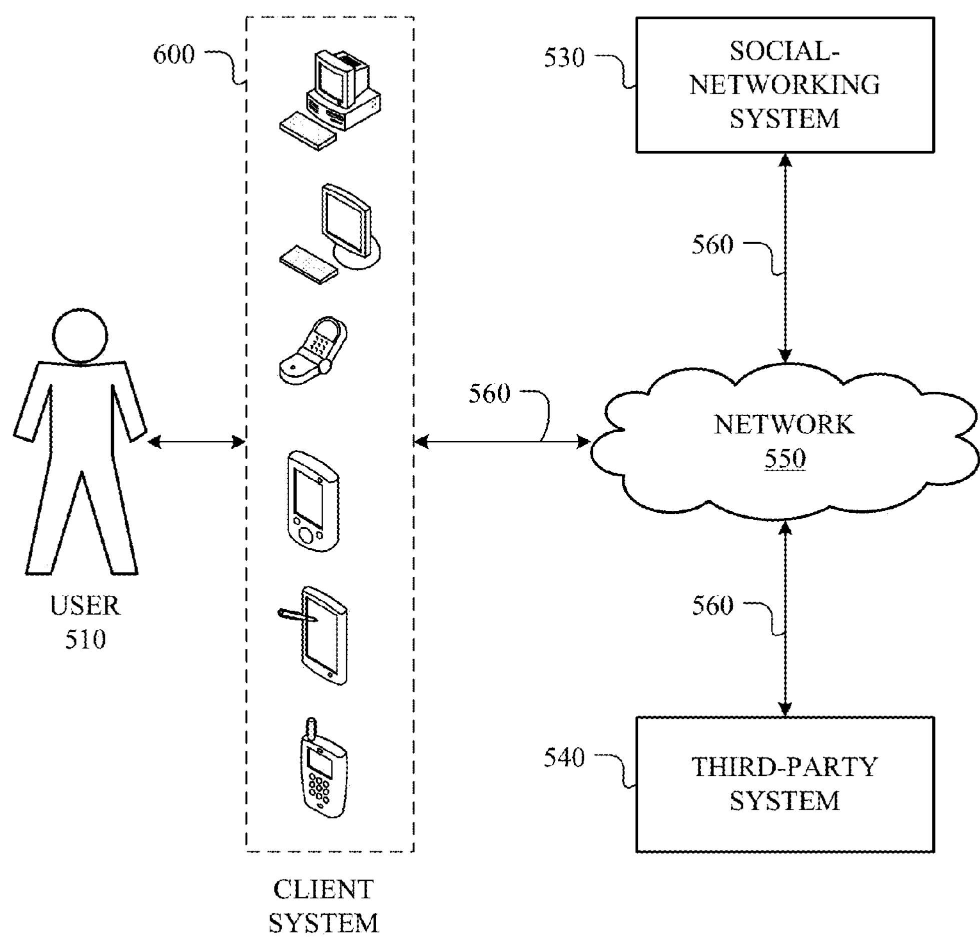
FIG. 5 is a block diagram of an example network environment associated with a social-networking system.

FIG. 5 illustrates an example network environment 500 associated with a social-networking system. Network environment 500 includes a user 510, a client system 600, a social-networking system 530, and a third-party system 540 connected to each other by a network 550. Although FIG. 5 illustrates a particular arrangement of user 510, client system 600, social-networking system 530, third-party system 540, and network 550, this disclosure contemplates any suitable arrangement of user 510, client system 600, social-networking system 530, third-party system 540, and network 550. As an example and not by way of limitation, two or more of client system 600, social-networking system 530, and third-party system 540 may be connected to each other directly, bypassing network 550. As another example, two or more of client system 600, social-networking system 530, and third-party system 540 may be physically or logically co-located with each other in whole or in part. Moreover, although FIG. 5 illustrates a particular number of users 510, client systems 600, social-networking systems 530, third-party systems 540, and networks 550, this disclosure contemplates any suitable number of users 510, client systems 600, social-networking systems 530, third-party systems 540, and networks 550. As an example and not by way of limitation, network environment 500 may include multiple users 510, client system 600, social-networking systems 530, third-party systems 540, and networks 550.

In particular embodiments, user 510 may be an individual (human user), an entity (e.g., an enterprise, business, or third-party application), or a group (e.g., of individuals or entities) that interacts or communicates with or over social-networking system 530. In particular embodiments, social-networking system 530 may be a network-addressable computing system hosting an online social network. Social-networking system 530 may generate, store, receive, and transmit social-networking data, such as, for example, user-profile data, concept-profile data, social-graph information, or other suitable data related to the online social network. Social-networking system 530 may be accessed by the other components of network environment 500 either directly or via network 550. In particular embodiments, social-networking system 530 may include an authorization server that allows users 510 to opt in or opt out of having their actions logged by social-networking system 530 or shared with other systems (e.g., third-party systems 540), such as, for example, by setting appropriate privacy settings. In particular embodiments, third-party system 540 may be a network-addressable computing system that can host third-party content objects and serve content, and/or provide a third-party advertisement serving engine. Third-party system 540 may generate, store, receive, and transmit third-party content and/or sponsored content, such as, for example, advertisements, incentive program notifications, coupons, etc. Third-party system 540 may be accessed by the other components of network environment 500 either directly or via network 550. In particular embodiments, one or more users 510 may use one or more client systems 600 to access, send data to, and receive data from social-networking system 530 or third-party system 540. Client system 600 may access social-networking system 530 or third-party system 540 directly, via network 550, or via a third-party system. As an example and not by way of limitation, client system 600 may access third-party system 540 via social-networking system 530. Client system 600 may be any suitable computing device, such as, for example, a personal computer, a laptop computer, a cellular telephone, a smartphone, or a tablet computer.

This disclosure contemplates any suitable network 550. As an example and not by way of limitation, one or more portions of network 550 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 550 may include one or more networks 550.

Links 560 may connect client system 600, social-networking system 530, and third-party system 540 to communication network 550 or to each other. This disclosure contemplates any suitable links 560. In particular embodiments, one or more links 560 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 560 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 560, or a combination of two or more such links 560. Links 560 need not necessarily be the same throughout network environment 500. One or more first links 560 may differ in one or more respects from one or more second links 560.

In particular embodiments, the social-networking system includes a relevance and ranking engine to determine a relevance score for nodes in the social graph and third-party content objects, relative to a user. The relevance and ranking engine may also rank the content objects by their relevance scores. The relevance and ranking engine may also select content objects for sending to users as notifications or as responses to user requests.

To calculate the relevance score, the relevance and ranking engine may determine a location value by comparing the content object location and a current location for the computing device. The relevance and ranking engine may also determine an interest value based on whether the content object categories are included in the user's interests. The relevance and ranking engine may also determine a time value based on whether the current time is within the delivery time range for the content object. The relevance and ranking engine may also determine a connection value based on how many of the user's connections are associated with the content object. Then, the relevance and ranking engine combines the location value, interest value, connection value, and time value to determine the relevance score for the content object with respect to the user. In one embodiment the values are higher for a better fit (closer proximity, great similarity, etc.) and approach a value of one, and are multiplied together to yield the relevance score.

From the relevance scores for each content object, the relevance and ranking engine ranks the content objects for a user, e.g., from highest relevance score to lowest. The relevance and ranking engine then can select content objects to send to a notification controller, or can serve the highest ranked content object directly to the computing device as a notification(s).

Example Computing System

Figure 6:
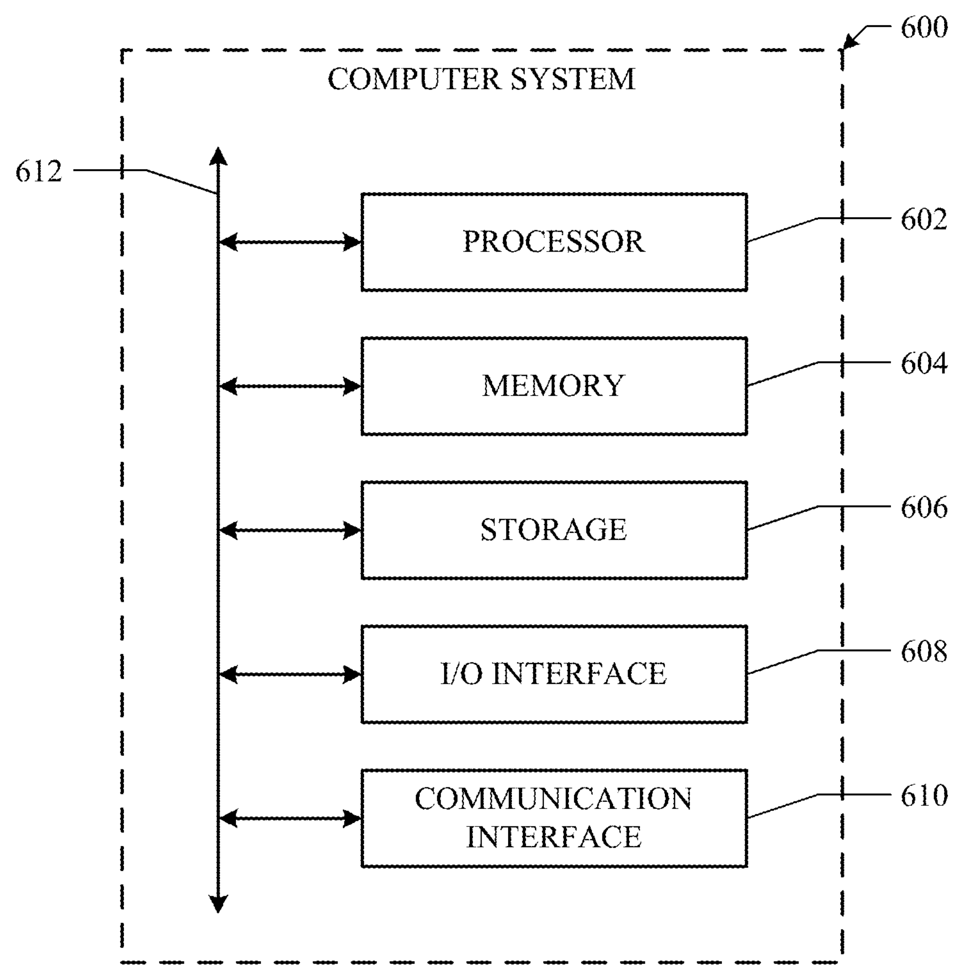
FIG. 6 is a block diagram of an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, another mobile computing device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

maintaining, by one or more computing devices associated with a social-networking system, a social graph comprising a plurality of nodes and a plurality of edges connecting the nodes, wherein:

the nodes comprise:

a plurality of user nodes that are each associated with a user of the social-networking system; and a plurality of concept nodes that are each associated with a concept, and each of the one or more concept nodes is associated with a respective location;

receiving, by one or more computing devices associated with the social-networking system, a request from a computing device associated with a requesting user for social information, wherein the request comprises:

a location of the computing device associated with the requesting user;

an orientation of the computing device associated with the requesting user; and an identifier for the requesting user;

determining, by one or more computing devices associated with the social-networking system, a relevance score for each of one or more concept nodes associated with respective locations within a threshold distance of the computing device associated with the requesting user, wherein:

the relevance scores are determined based on:

the request;

a time value for each of the one or more concept nodes with respective locations within a threshold distance of the computing device associated with the requesting user, the time value based on whether a current time is within a delivery time range assigned to the concept node;

social-networking information associated with the requesting user, maintained by the social-networking system; and the respective locations associated with the concept nodes; and based on the relevance scores, by one or more computing devices associated with the social-networking system, causing to be displayed on the computing device associated with the requesting user social-networking information associated with at least one of the concept nodes within a threshold distance of the computing device associated with the requesting user, in conjunction with a live video image of at least one location associated with one or more of the concept nodes within the threshold distance of the computing device associated with the requesting user.

2. The method of claim 1, wherein the computing device associated with the requesting user comprises a screen, a heads-up display, a camera, a gyroscope, a compass, or any combination thereof.

3. The method of claim 1, wherein the social-networking information comprises:

affinity information for the requesting user according to one or more categories; and a plurality of connections between the requesting user and other users of the social-networking system.

4. The method of claim 1, wherein determining the relevance score comprises:

combining a location value, an interest value, a connection value, and a time value to determine the relevance score.

5. The method of claim 1, wherein determining the relevance score comprises determining a location value for each of one or more concept nodes with respective locations within a threshold distance of the computing device associated with the requesting user, the location value based on (1) a proximity between the location associated with the concept node and the location of the computing device associated with the requesting user, (2) the orientation of the computing device associated with the requesting user, or (3) any combination thereof.

6. The method of claim 1, wherein determining the relevance score comprises determining an interest value for each of one or more concept nodes with respective locations within a threshold distance of the computing device associated with the requesting user, the interest value based on whether a category associated with the concept node is included in the one or more categories associated with the affinity information for the requesting user.

7. The method of claim 1, wherein determining the relevance score comprises:

determining a connection value for each of one or more concept nodes with respective locations within a threshold distance of the computing device associated with the requesting user, the connection value based on a number of the requesting user's connections with the concept node.

8. The method of claim 1, wherein the delivery time range assigned to the concept node has an action associated with it, where the action can be performed by the requesting user.

9. The method of claim 1, wherein the delivery time range assigned to the concept node indicates whether the concept node is eligible to be received by the requesting user.

10. The method of claim 1, further comprising receiving location information comprising a location of a computing device associated with the requesting user.

11. The method of claim 10, wherein the location information is received from the computing device at predetermined intervals.

12. The method of claim 1, further comprising storing a requesting user exposure to a node of the social graph.

13. The method of claim 12, further comprising adjusting the relevance scores of at least one of the concept nodes with respective locations within a threshold distance of the computing device associated with the requesting user based on the requesting user exposure to the at least one of the concept nodes.

14. The method of claim 1, further comprising ranking the concept nodes by their relevance scores.

15. The method of claim 1, further comprising:

receiving indication of an action by the requesting user in association with at least one of the concept nodes within a threshold distance of the computing device associated with requesting user; and updating the social graph in response to the indication.

16. The method of claim 1, wherein the one or more nodes of the social graph comprise information provided by third-parties, information about interactions of users with the social networking system, or any combination thereof.

17. One or more computer-readable non-transitory storage media embodying software that is operable when executed to:

maintain, by one or more computing devices associated with a social-networking system, a social graph comprising a plurality of nodes and a plurality of edges connecting the nodes, wherein:

the nodes comprise:

a plurality of user nodes that are each associated with a user of the social-networking system; and a plurality of concept nodes that are each associated with a concept, and each of one or more of the concept nodes is associated with a respective location;

receive, by one or more computing devices associated with the social-networking system, a request from a computing device associated with a requesting user for social information, wherein the request comprises:

a location of the computing device associated with the requesting user;

an orientation of the computing device associated with the requesting user; and an identifier for the requesting user;

determine, by one or more computing devices associated with the social-networking system, a relevance score for each of one or more concept nodes associated with respective locations within a threshold distance of the computing device associated with the requesting user, wherein:

the relevance scores are determined based on:

the request;

a time value for each of the one or more concept nodes with respective locations within a threshold distance of the computing device associated with the requesting user, the time value based on whether a current time is within a delivery time range assigned to the concept node;

social-networking information associated with the requesting user, maintained by the social-networking system; and the respective locations associated with the proximate concept nodes; and based on the relevance scores, by one or more computing devices associated with the social-networking system, causing to be displayed on the computing device associated with the requesting user social-networking information associated with at least one of the concept nodes within a threshold distance of the computing device associated with the requesting user, in conjunction with a live video image of at least one location associated with one or more of the concept nodes within the threshold distance of the computing device associated with the requesting user.

18. A social-networking system comprising:

one or more processors associated with the social-networking system; and a memory coupled to the processors comprising instructions executable by the processors, the processors operable when executing the instructions to:

maintain a social graph comprising a plurality of nodes and a plurality of edges connecting the nodes, wherein the nodes comprise:

a plurality of user nodes that are each associated with a user of the social-networking system; and a plurality of concept nodes that are each associated with a concept, and each of the one or more concept nodes is associated with a respective location;

receive a request from a computing device associated with a requesting user for social information, wherein the request comprises:

a location of the computing device associated with the requesting user;

an orientation of the computing device associated with the requesting user; and an identifier for the requesting user;

determine a relevance score for each of one or more concept nodes associated with respective locations within a threshold distance of the computing device associated with the requesting user, wherein:

the relevance scores are determined based on:

the request;

a time value for each of the one or more concept nodes with respective locations within a threshold distance of the computing device associated with the requesting user, the time value based on whether a current time is within a delivery time range assigned to the concept node;

social-networking information associated with the requesting user, maintained by the social-networking system; and the respective locations associated with the concept nodes; and based on the relevance scores, causing to be displayed on the computing device associated with the requesting user social-networking information associated with at least one of the concept nodes within a threshold distance of the computing device associated with the requesting user, in conjunction with a live video image of at least one location associated with one or more of the concept nodes within the threshold distance of the computing device associated with the requesting user.

19. The system of claim 18, wherein the social-networking information associated with at least one concept nodes within a threshold distance of the computing device associated with the requesting user is provided to a computing device associated with the requesting user.

* * * * *